(12) United States Patent
Wen et al.

(10) Patent No.: US 11,245,464 B2
(45) Date of Patent: Feb. 8, 2022

(54) DIRECTION-OF-ARRIVAL ESTIMATION AND MUTUAL COUPLING CALIBRATION METHOD AND SYSTEM WITH ARBITRARY SENSOR GEOMETRY AND UNKNOWN MUTUAL COUPLING

(71) Applicant: YANGTZE UNIVERSITY, Jingzhou (CN)

(72) Inventors: Fangqing Wen, Jingzhou (CN); Ke Wang, Jingzhou (CN); Changxin Cai, Jingzhou (CN)

(73) Assignee: YANGTZE UNIVERSITY, Jingzhou (CN)

(*) Notice: Subject to any disclaimer, the term of this patent is extended or adjusted under 35 U.S.C. 154(b) by 183 days.

(21) Appl. No.: 16/744,858

(22) Filed: Jan. 16, 2020

(65) Prior Publication Data
US 2021/0159964 A1 May 27, 2021

(30) Foreign Application Priority Data
Nov. 25, 2019 (CN) .......................... 201911165917.6

(51) Int. Cl.
H04B 7/08 (2006.01)
H04B 17/21 (2015.01)
H04B 17/336 (2015.01)
H04B 7/0426 (2017.01)

(52) U.S. Cl.
CPC ............. *H04B 7/086* (2013.01); *H04B 7/043* (2013.01); *H04B 17/21* (2015.01); *H04B 17/336* (2015.01)

(58) Field of Classification Search
CPC ...... H04B 17/12; H04B 17/336; H04B 17/21; H04B 7/086; H04B 7/043
See application file for complete search history.

(56) References Cited

U.S. PATENT DOCUMENTS

| | | | |
|---|---|---|---|
| 8,576,769 B2* | 11/2013 | Zheng | H04B 7/086 370/316 |
| 9,559,417 B1* | 1/2017 | Schwarzwalder | H04B 7/0617 |
| 10,386,447 B2* | 8/2019 | Badawy | G01S 3/38 |
| 10,481,242 B2* | 11/2019 | Ikram | G01S 3/023 |

(Continued)

*Primary Examiner* — Redentor Pasia
(74) *Attorney, Agent, or Firm* — Hemisphere Law, PLLC; Zhigang Ma

(57) ABSTRACT

The direction-of-arrival estimation and mutual coupling calibration method and system with arbitrary sensor geometry and unknown mutual moupling are disclosed, a direction-of-arrival estimation and mutual coupling calibration method with arbitrary sensor geometry and unknown mutual moupling, comprising the following steps: acquiring an array signal, and then estimating a covariance matrix according to the array signal, a noise subspace is obtained by eigendecomposition of the covariance matrix; determining the angle search range of DOA, and generating a group of grids according to the angle search range of DOA, based on the noise subspace and the mutual coupling matrix between the elements, and obtaining a spectrum function corresponding to each grid; Estimating DOA based on the peak value of spectrum function corresponding to each grid, and obtaining the mutual coupling coefficient between the array elements from the DOA. The DOA estimation and mutual coupling calibration of arbitrary array manifold under the condition of mutual coupling are realized simply.

6 Claims, 4 Drawing Sheets

--- acquiring an array signal, and then estimating a covariance matrix according to the array signal, a noise subspace is obtained by eigendecomposition of the covariance matrix

↓ determining the angle search range of DOA, and generating a group of grids according to the angle search range of DOA, based on the noise subspace and the mutual coupling matrix between the elements, and obtaining a spectrum function corresponding to each grid

↓

Estimating DOA based on the peak value of spectrum function corresponding to each grid, and obtaining the mutual coupling coefficient between the array elements from the DOA

(56) References Cited

U.S. PATENT DOCUMENTS

| | | | |
|---|---|---|---|
| 2007/0139268 A1* | 6/2007 | Xin | H04B 7/086 342/417 |
| 2008/0130914 A1* | 6/2008 | Cho | G10L 21/0208 381/94.1 |
| 2008/0231505 A1* | 9/2008 | Zhu | G01S 3/74 342/350 |
| 2010/0106440 A1* | 4/2010 | Richmond | G01S 3/74 702/71 |
| 2011/0075601 A1* | 3/2011 | Zheng | H04B 7/086 370/316 |
| 2017/0090016 A1* | 3/2017 | Ikram | G01S 7/4004 |
| 2020/0058311 A1* | 2/2020 | Goodwin | H04S 3/02 |
| 2020/0166616 A1* | 5/2020 | East-Lavoie | G01S 7/4865 |
| 2020/0355789 A1* | 11/2020 | Kitamura | H04B 7/08 |

\* cited by examiner acquiring an array signal, and then estimating a covariance matrix according to the array signal, a noise subspace is obtained by eigendecomposition of the covariance matrix determining the angle search range of DOA, and generating a group of grids according to the angle search range of DOA, based on the noise subspace and the mutual coupling matrix between the elements, and obtaining a spectrum function corresponding to each grid Estimating DOA based on the peak value of spectrum function corresponding to each grid, and obtaining the mutual coupling coefficient between the array elements from the DOA

FIG.1

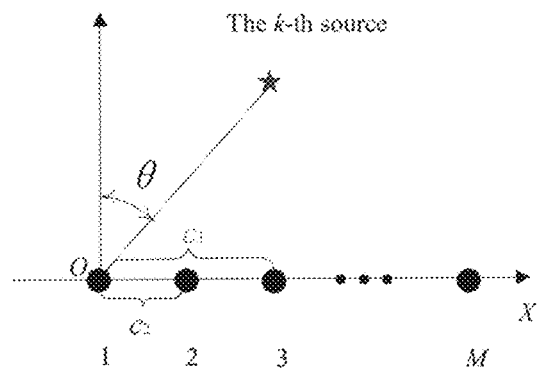

FIG.2

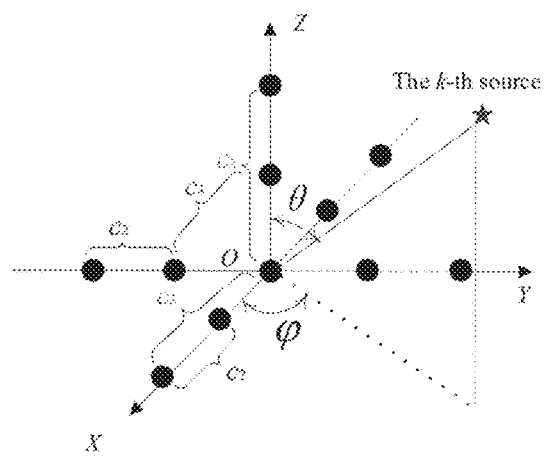

FIG.3

DIRECTION-OF-ARRIVAL ESTIMATION AND MUTUAL COUPLING CALIBRATION METHOD AND SYSTEM WITH ARBITRARY SENSOR GEOMETRY AND UNKNOWN MUTUAL COUPLING

The disclosure relates to direction-of-arrival estimation and mutual coupling calibration method and system with arbitrary sensor geometry and unknown mutual Coupling

BACKGROUND

DOA estimation has a long history of more than 60 years, at present, a lot of excellent angle estimation methods have emerged, for example, multiple signal classification algorithm and method of estimating signal parameters by rotation invariance. In fact, sensor errors always exist. Typical sensor errors include gaining phase error, position error and mutual coupling effect. Among them, the mutual coupling effect is a kind of common array error. The mutual coupling effect between sensors is caused by the coupling effect of array antenna elements, which will lead to model mismatch in DOA estimation and may lead to severe degradation of estimation performance. In order to obtain the best DOA estimation, it is necessary to establish the self calibration function in the sensor array, and calibrate the sensor error while using the sensor array to collect signals. Joint DOA estimation and mutual coupling error calibration have attracted wide attention.

There is an active calibration method in the prior art, but it needs additional auxiliary elements. There is also an iterative algorithm for Joint DOA and mutual coupling coefficient estimation without auxiliary sources or auxiliary elements. However, this iterative process is inefficient. In order to reduce the computation, the recursive rank reduction method has been derived. In addition, the researchers studied DOA estimation and mutual coupling calibration from the perspective of Bayesian learning. Some people have improved Bayesian learning algorithm, which can solve the problem of off grid. But the above solutions are suitable for special array manifolds, such as uniform linear array, uniform rectangular array, uniform circular array, etc. In this case, array mutual coupling is modeled as a matrix with special structure, such as symmetric Toeplitz matrix, symmetric loop or symmetric block Toeplitz matrix.

In practical engineering, due to space constraints, sensor arrays may be distributed in irregular array manifolds. In this case, the mutual coupling matrix has almost no other special structure except symmetry. In order to reduce the mutual coupling effect in DOA estimation, a two-step iterative method is proposed. This method is suitable for arbitrary geometry array manifolds, but its iterative computation is too complex to be used in real-time systems.

SUMMARY

A technical problem to be solved by the disclosure is to provide a direction-of-arrival estimation and mutual coupling calibration method and system with arbitrary sensor geometry and unknown mutual moupling.

Direction-of-arrival estimation and mutual coupling calibration method with arbitrary sensor geometry and unknown mutual moupling, comprising the following steps:

(a) acquiring an array signal, and then estimating a covariance matrix according to the array signal, a noise subspace is obtained by eigendecomposition of the covariance matrix;

(b) determining the angle search range of DOA, and generating a group of grids according to the angle search range of DOA, based on the noise subspace and the mutual coupling matrix between the elements, and obtaining a spectrum function corresponding to each grid;

(c) Estimating DOA based on the peak value of spectrum function corresponding to each grid, and obtaining the mutual coupling coefficient between the array elements from the DOA.

The beneficial effect of the technical scheme proposed in the disclosure is: by acquiring the array signal, and then estimating a covariance matrix according to the array signal, a noise subspace is obtained by eigendecomposition of the covariance matrix; determining the angle search range of DOA, and generate a group of grids according to the angle search range of DOA, according to the noise subspace and the mutual coupling matrix between the elements, a spectrum function corresponding to each grid is obtained; according to the peak value of spectrum function corresponding to each grid, DOA is estimated, obtaining the mutual coupling coefficient between the array elements from the DOA, the DOA estimation and mutual coupling calibration of arbitrary array manifold under the condition of mutual coupling are realized simply.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures:

FIG. 1 is a flow chart of direction-of-arrival estimation and mutual coupling calibration method with arbitrary sensor geometry and unknown mutual moupling;

FIG. 2 is a schematic of ULA;

FIG. 3 is a schematic of 3D-ULA;

DETAILED DESCRIPTION OF PREFERRED EMBODIMENTS

Figure 4:
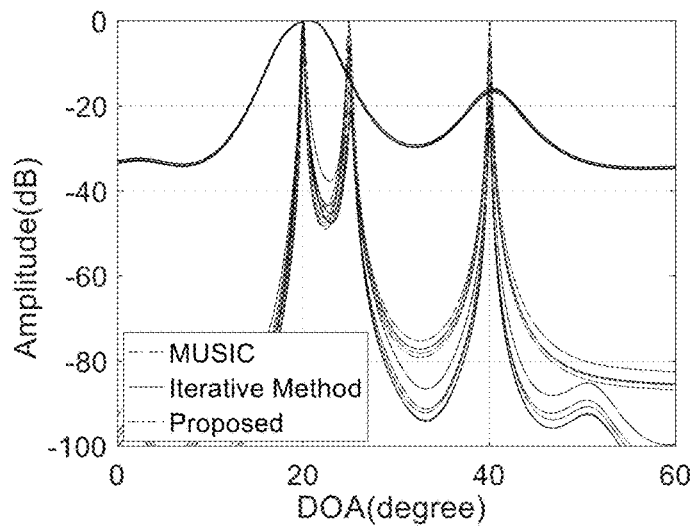
FIG. 4 is a comparison diagram of spatial spectrum in scenario 1.

As illustrated in FIG. 1, a direction-of-arrival estimation and mutual coupling calibration method and system with arbitrary sensor geometry and unknown mutual moupling, includes the following steps:

S100 acquiring an array signal, and then estimating a covariance matrix according to the array signal, a noise subspace is obtained by eigendecomposition of the covariance matrix;

S200 determining the angle search range of DOA, and generating a group of grids according to the angle search range of DOA, based on the noise subspace and the mutual coupling matrix between the elements, and obtaining a spectrum function corresponding to each grid;

S300 Estimating DOA based on the peak value of spectrum function corresponding to each grid, and obtaining the mutual coupling coefficient between the array elements from the DOA.

We consider the vehicle equipped with an M-element sensor array. Without losing generality, the sensors are distribute in 3D space, and the coordinate of the m-th (m=1, 2, . . . , M) sensor is set to $p_m[x_m, y_m, z_m]^T$ Assume K uncorrelated sources appearing in the far-field. The DOA pair (or DOA) of the k-th (k=1, 2, . . . , K) source is denoted by $\Theta_k=[\theta_k, \phi_k]^T$, where $\theta_k$ and $\phi_k$ account for, respectively, the k-th elevation angle and the k-th azimuth angle. The received array signal can be expressed as $$x(t) = \sum_{k=1}^{K} a(\Theta_k) s_k(t) + n(t) \quad (1)$$
$$= As(t) + n(t)$$

Where $a(\Theta_k)=[\exp\{-j2\pi_{\tau_{1,k}}/\lambda\}, \exp\{-j2\pi_{\tau_{2,k}}/\lambda\}, \ldots, \exp\{-j2\pi_{\tau_{M,k}}/\lambda\}] \in £^{M \times 1}$ is the response vector corresponding to the k-th target, $\lambda$ is the carrier wavelength, $s_k(t)$ is the k-th baseband signal, n (t) is the array noise. $£^{M \times 1}$ is M×1 complex matrix, $A=[a(\Theta_1), a(\Theta_2), \ldots, a(\Theta_K)] \in £^{M \times K}$ is directional matrix, $s(t)=[s_1(t), s_2(t), \ldots, s_K(t)]^T$ is signal source matrix, $\tau_{m,k}$ has the following form $$\tau_{m,k}=p_m^T r_k \quad (2)$$

Among, $r_k @ [\cos(\phi_k)\sin(\phi_k), \cos(\phi_k)\sin(\theta_k), \cos(\theta_k)]^T$, when the mutual coupling effect exists, Signal expression (1) is invalid. The mutual coupling matrix is introduced to describe the mutual coupling effect among the elements. The specific form is as follows $$C = \begin{bmatrix} c_1 & c_2 & c_3 & \cdots & c_Q \\ c_2 & c_1 & c_{Q+1} & \cdots & c_M \\ c_3 & c_{Q+1} & c_1 & \cdots & c_{M-1} \\ \vdots & \ddots & \vdots & \ddots & \vdots \\ c_Q & c_M & c_{M-1} & \cdots & c_1 \end{bmatrix} \quad (3)$$

the mutual coupling coefficient $c_m$ between the p and the q elements, under ideal conditions, $c_m$ is size is inversely proportional to the distance between elements, in practice, if the distance is greater than the given threshold, the mutual coupling coefficient is approximately 0, It can be seen from expression (3) that C is a symmetric matrix, obviously, C are only $$1 + \frac{M(M-1)}{2}$$

different entities in it. In this case, the array signal in expression (1) can be rewritten as $$x(t)=CAs+n(t) \quad (4)$$

If n(t) is Gaussian white noise and s(t) is not related to the signal source, x(t) is covariance matrix can be expressed as $$R=CAR_sA^HC^H+\sigma^2 I_M \quad (5)$$

$R_s=\text{diag}\{\sigma_1, \sigma_2, \ldots, \sigma_K\}$ is the covariance matrix of the signal source s(t), $\delta_K$ is the power of the K signal source, $\sigma$ is noise variance. When the number of snapshots L is fixed, t=1, 2, L, L, the covariance matrix R can be estimated by the following formula $$\hat{R} = \frac{1}{L}\sum_{t=1}^{x} x(t)x^H(t) \quad (6)$$

Preferably, a noise subspace is obtained by eigendecomposition of the covariance matrix, including $$\hat{R} = \sum_{m=1}^{m} \alpha_m u_m u_m^H \quad (7)$$
$$= U_s \sum_s U_s^H + U_n \sum_n U_n^H$$

$\hat{R}$ is covariance matrix, $\alpha_1 \geq \alpha_2 \geq \ldots \geq \alpha_K \geq \alpha_{K+1} \geq \ldots \geq \alpha_M$ are the eigenvalue of covariance matrix, $u_m \in £^{M \times 1}$ is the eigenvector corresponding to the eigenvalue of the covariance matrix, $U_s=[u_1, u_2, \ldots, u_K]$, $\Sigma_s=\text{diag}\{\alpha_1, \alpha_2, \ldots, \alpha_K\}$, $U_n=[u_{K+1}, u_{K+2}, \ldots, u_M]$, $\Sigma_n=\text{diag}\{\alpha_{K+1}, \alpha_{K+2}, \ldots, \alpha_M\}$, $U_s$ and $U_n$ are signal subspace and noise subspace respectively.

Specific implementation, $U_s$ and $U_n$ are orthogonal to each other, $U_s$ and CA have the same space, therefore $$U_n^H Ca(\Theta_k)=0 \quad (8)$$

If we use MUSIC method to estimate DOA, we need to calculate the following spectral function $$\min a^H(\Theta)C^H U_n U_n^H Ca(\Theta_k) \quad (9)$$

In general, set all grids that may be composed of DOA, and find the peak of expression (9).

Preferably, according to the noise subspace and the mutual coupling matrix between the array elements, the spectrum function corresponding to each grid is obtained, including, using max $d^H Q^{-1}(\Theta)d$ to get the spectrum function of each grid, $Q(\Theta)=T^H(\Theta)U_n U_n^H T(\Theta)$, $T(:,q)=J_q a$, $a \in £^{M \times M}$, $$J_q(m,n) = \begin{cases} 1, & C(m,n) = c_q \\ 0, & C(m,n) \neq c_q \end{cases},$$

$d=[1, 0, \ldots, 0]^T$, q=1, 2, 3 . . . Q, Q<M, C is the mutual coupling matrix between elements, $U_n$ is the noise subspace, $T \in £^{M \times Q}$, $c=[(c_1, c_2, \ldots, c_Q]^T$, $T(:,q)$ is column Q of T, $1 \leq n$, $m \leq M$.

For mutual coupling matrix $C \in £^{M \times M}$ and vector $a \in £^{M \times M}$, if there are only Q(Q<M) different elements in C, $c=[c_1, c_2, \ldots, c_Q]^T$, then there are the following transformations, $$Ca=Tc \quad (10)$$

among, the q(q=1, 2, L, Q) column of $ET££^{M \times Q}$ is given by the following formula, $$T(:,q) = J_q a \qquad (11)$$

$J_q$ is defined as $$J_q(m, n) = \begin{cases} 1, & C(m, n) = c_q \\ 0, & C(m, n) \neq c_q \end{cases} \qquad (12)$$

$$Ca(\Theta) = T(\Theta)c \qquad (13)$$

among $T(\Theta) \in £^{M \times Q}$, $c \in £^{Q \times 1}$, so expression (9) can be modified to $$\min c^H T^H(\Theta) U_n U_n^H T(\Theta)c \qquad (14)$$

$Q(\Theta) = T^H(\Theta) U_n U_n^H T(\Theta)$, obviously, expression (14) is a quadratic optimization problem. In order to avoid c=0 no solution, constraints can be enforced $$d^H c = \rho \qquad (15)$$

$\rho$, is a constant, $d = [1, 0, L, 0]^T$, so expression (15) can be converted to $$\min c^H Q(\Theta)c \text{ s.t.}, d^H c/\rho = 1 \qquad (16)$$

It should be noted that s.t. is the expression symbol of constraint condition, the above problems can be solved by Lagrange multiplier method and a Lagrange function can be constructed $$L(\Theta) = c^H Q(\Theta)c - \tau(d^H c/\rho - 1) \qquad (17)$$

Where $\tau$ is the Lagrange multiplier, $\partial L(\Theta)/c = 0$ $$2Q(\Theta)c + \frac{\tau}{\rho}d = 0 \qquad (18)$$

So we can get $$c = \xi Q^{-1}(\Theta)d/\rho \qquad (19)$$

Where $\xi$ is a constant, combine expression (19) and expression (15)

$$\xi = \frac{\rho^2}{d^H Q^{-1}(\Theta)d} \qquad (20)$$

Substituting expression (20) into expression (19), $$c = \frac{\rho^2 Q^{-1}(\Theta)d}{\rho^H Q^{-1}(\Theta)d} \qquad (21)$$

Finally, we can rewrite expression (16) to $$\min \frac{|\rho^4|}{d^H Q^{-1}(\Theta)d} \qquad (22)$$

Because $\rho$ is a constant, so expression (22) is equal to $$\max d^H Q^{-1}(\Theta)d \qquad (23)$$

Preferably, obtaining the mutual coupling coefficient between the array elements from the DOA, specifically, $$\hat{c} = \frac{1}{K} \sum_{k=1}^{K} \frac{\rho^2 Q^{-1}(\hat{\Theta}_k)d}{d^H Q^{-1}(\hat{\Theta}_k)d} \qquad (24)$$

is used to obtain the mutual coupling coefficient between the elements, c is the mutual coupling coefficient, $\rho$ is the constant, $\hat{\Theta}_k$ is the DOA.

It should be noted that the DOA pair (or DOA) can be estimated by K peaks of expression (23). If $c_1 = 1$, the scaling effect in expression (24) can be removed by normalization operation. It should be noted that in the absence of noise, $$c^H Q(\Theta)c = 0 \qquad (25)$$

When $c \neq 0$, the necessary condition of expression (25) is that $Q(\Theta)$ has rank defect, that is $$\det\{Q(\Theta)\} = 0 \qquad (26)$$

according to expression (27), the method of DOA estimation can be replaced by $$\max \frac{1}{\det\{Q(\Theta)\}} \qquad (27)$$

In order to illustrate the performance of the method of DOA estimation and calibration of arbitrary array manifold under the condition of mutual coupling in the embodiment of the present disclosure, the method of DOA estimation and calibration of arbitrary array manifold under the condition of mutual coupling (hereinafter referred to as the method of the present disclosure) is advanced with the traditional music method (marked as music), iteration method (marked as iteration method) and Cramer boundary (marked as CRB) Row comparison.

In a specific implementation, there are M array elements and K far-field sources; the source signal satisfies the normal distribution and collects L=200 times of snapshot data; the SNR in the simulation is defined as $$\text{SNR}@10 \log_{10}(\|x(t) - n(t)\|_F^2 / \|n(t)\|_F^2)$$

All simulations are run on HP z840 system and MATLAB r2016a; there are two mutual coupling simulation scenarios in the embodiment of the present disclosure, respectively, Scenario 1. In ULA, the distance between elements is $\lambda/2$, the schematic diagram of ULA, as shown in FIG. 2, assume Q=3, $c=[1, 0.8+0.5j, 0.2+0.1j]^T$ in the simulation, in this case, DOA can be estimated only by estimating azimuth;

Scenario 2. In 3D-ULA, the distance between elements is $\lambda/2$ and there are M=12 elements, schematic diagram of 3D-ULA, as shown in FIG. 3, suppose the mutual coupling coefficient between two adjacent elements is $c_2 = 0.8+0.5j$, the mutual coupling coefficient between two elements with a distance of $\lambda$ is $c_3 = 0.017+0.035j$, the mutual coupling coefficient between two elements of "cross adjacent" is $c_4 = 0.2+0.1j$, therefore, Q=4, $c=[1, 0.8+0.5j, 0.017+0.035j, 0.2+0.1j]^T$.

In addition, assume that K=2 signal sources are located at $\Theta = (40°, 25°)$, $\Theta = (60°, 105°)$.

In the first embodiment, in the case of scenario I, the spatial spectrum of the method, music method and iteration method of the present disclosure is compared; more specifically, M=12, SNR=20 dB, K=3, the true values of DOA are 20° 25° 40°, the angle search range for all methods is [0°, 90°], the grid interval is 0.1°, for each method, 5 independent tests have been carried out; the spatial spectrum comparison diagram under scenario I is obtained, as shown in FIG. 4, it can be seen from FIG. 4 that the traditional music method can not work normally; however, the methods and iterative methods of the present disclosure provide good performance because they are strong enough to resist the mutual coupling effect.

Figure 5:
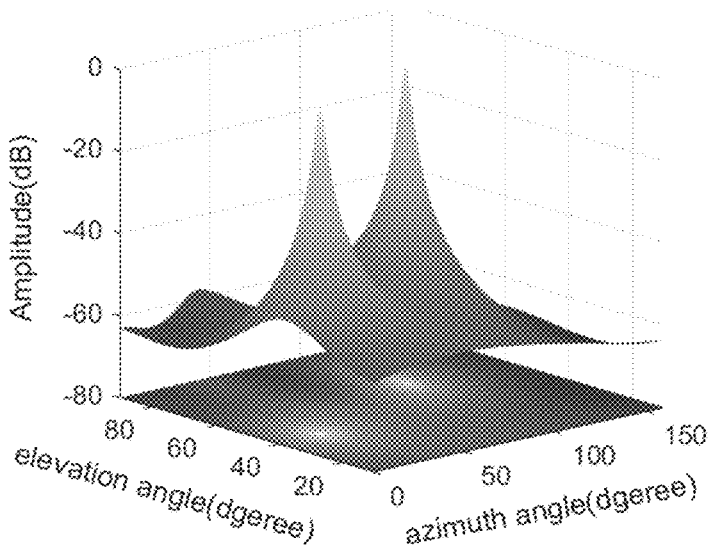
FIG. 5 is a Spatial spectrum in scenario 2.

In the second embodiment, the performance of the method described in the present disclosure is tested in the case of scenario 2, in which SNR=10 dB, the angle search range of θ is [0°, 90°], the grid interval is 0.5°, the search scope of φ is [0°, 180°], grid interval is I°, get the spatial spectrum of scenario 2, as shown in FIG. 5. Obviously, the method of the present disclosure can correctly detect and match two-dimensional (2D) DOA.

Figure 6:
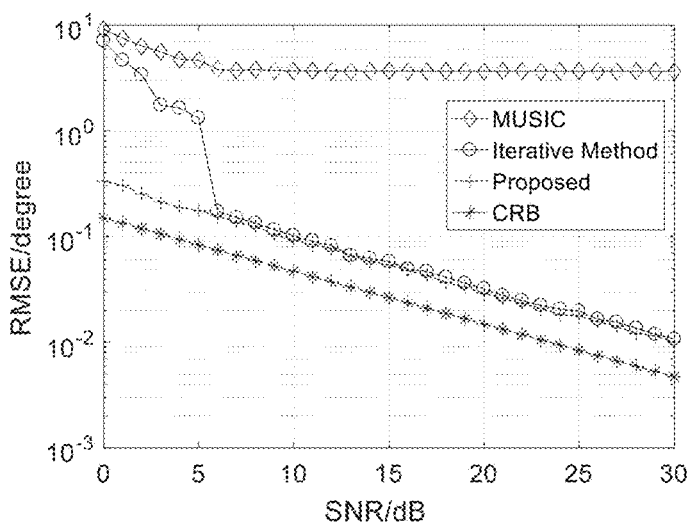
FIG. 6 is the relationship between RMSE and SNR estimated by DOA in scenario 1.
Figure 7:
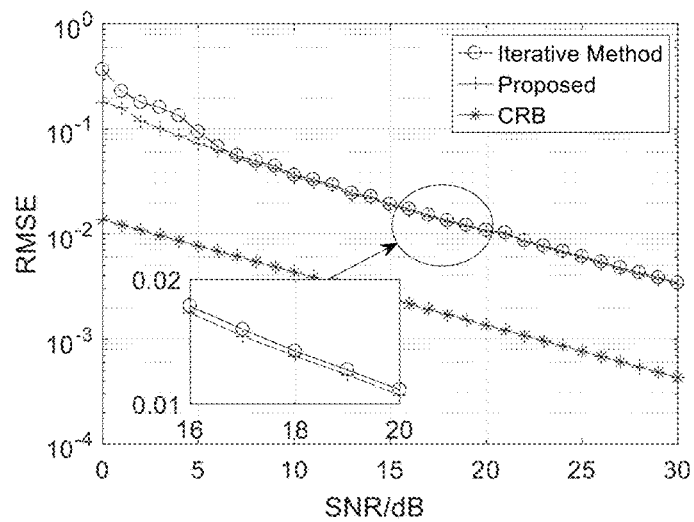
FIG. 7 is the relationship between RMSE and SNR of mutual coupling estimation in scenario 1.

In the third embodiment, in the case of test scenario 1, the root mean square error (RMSE) performance of the three methods is tested, M=12, K=2, DOA estimates are 20°, 30°, The angle search range of the three methods is [0°, 90°], grid interval is 0.1°, the RMSE curve and SNR of DOA estimation and mutual coupling coefficient estimation are calculated by 500 independent experiments. FIG. 6 shows the relationship between RMSE and SNR estimated by DOA in scenario 1. FIG. 7 shows the relationship between RMSE and SNR of mutual coupling estimation in scenario 1. The performance of music method is not shown in FIG. 7, because traditional music cannot provide mutual coupling estimation. The results show that the traditional music method can not work in this case; the method of the present disclosure is compared with the iterative method, when SNR is less than 1 dB, the method of the present disclosure provides better DOA estimation performance, when SNR is greater than 5 dB, the method of the present disclosure provides slightly better performance of RMSE. However, for the estimation of mutual coupling coefficient, the method advantage of the present disclosure is not obvious, because the absolute value of mutual coupling coefficient is usually less than 1, so the absolute error is relatively small.

Figure 8:
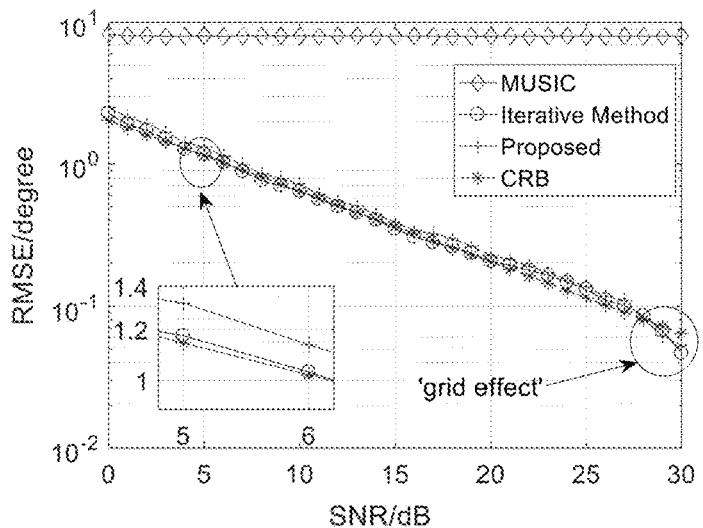
FIG. 8 is the relationship between RMSE and SNR estimated by DOA in scenario 2.
Figure 9:
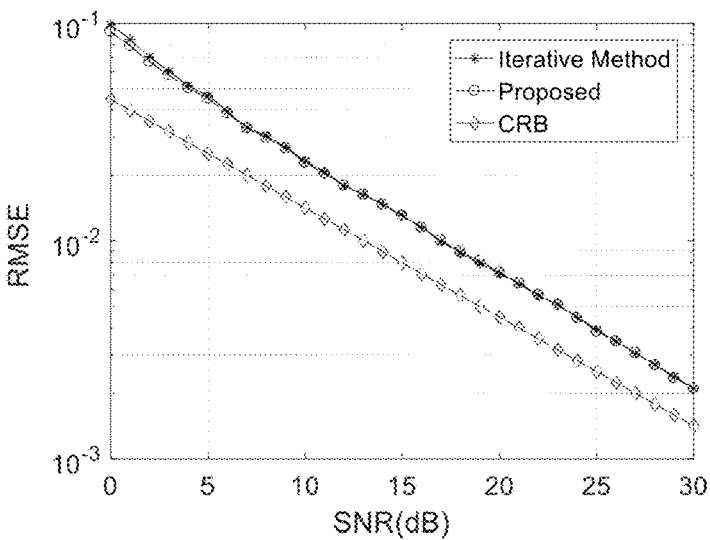
FIG. 9 is the relationship between RMSE and SNR of mutual coupling estimation in scenario 2.

In the fourth embodiment, the above simulation is repeated with scenario 2, the angle search range of θ is [20°, 80°], the grid interval is 0.2°, The RMSE curve of DOA estimation is obtained, the angle search range of φ is [0°, 130°], the grid interval is 0.5°, the RMSE curve of DOA estimation is obtained. FIG. 8 shows the relationship between RMSE and SNR estimated by DOA in scenario 2. It is clear from FIG. 8 that the traditional music method can not operate normally. In addition, the iterative method provides slightly better DOA estimation performance than the method of the present disclosure, but both can obtain CRB; the relationship between RMSE and SNR of mutual coupling estimation in scenario II is shown in FIG. 9; the RMSE of the method of the present disclosure is slightly better than the iterative algorithm, and there is a performance difference between the method of the present disclosure and CRB.

Figure 10:
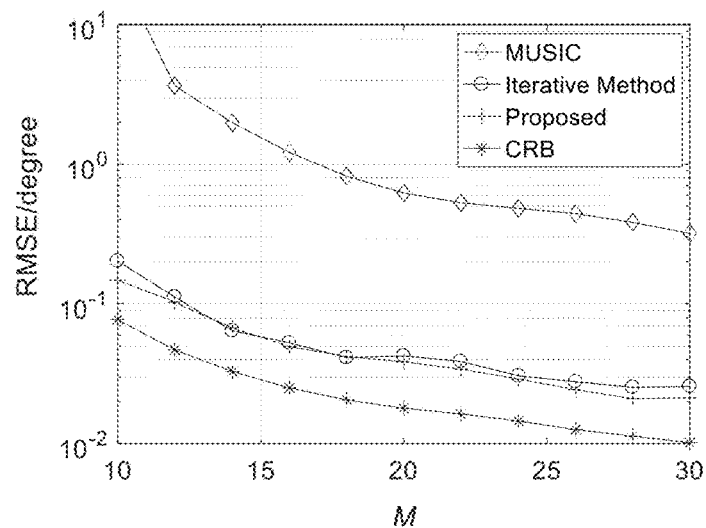
FIG. 10 is the relationship between RMSE and M estimated by DOA in scenario1.
Figure 11:
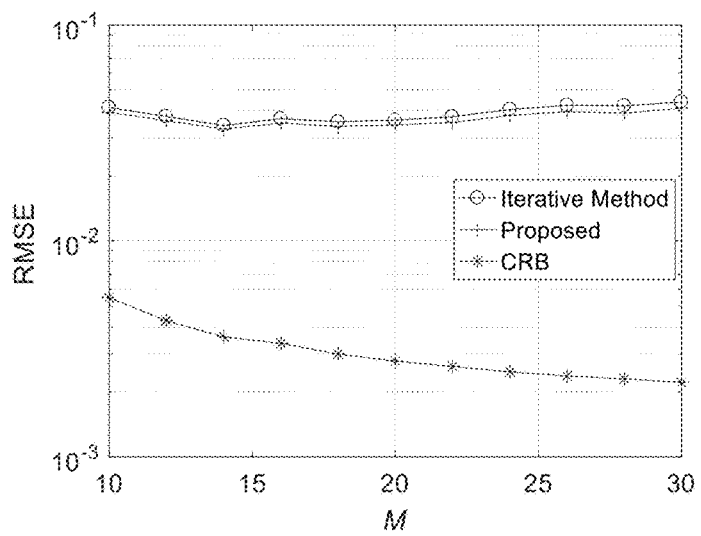
FIG. 11 is the relationship between RMSE and M of mutual coupling coefficient estimation in scenario 1.
Figure 12:
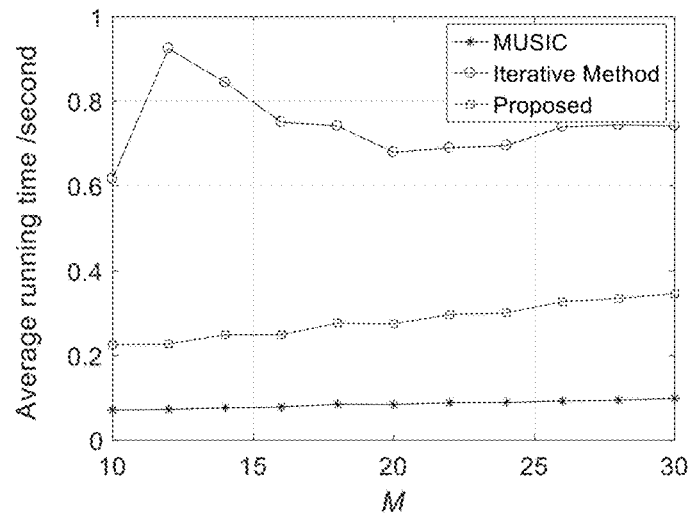
FIG. 12 is a graph of average operation time and M in scenario 1.

In the fifth embodiment, in test scenario 1, the relationship between the performance of different methods and the number of elements M, SNR=10 dB, other conditions are the same as in the third embodiment, The relationship between RMSE and M of DOA estimation in scenario 1, as shown in FIG. 10. The relationship between RMSE and m of mutual coupling coefficient estimation in scenario 1, as shown in FIG. 11. FIG. 10 and FIG. 11 show RMSE for DOA estimation and RMSE for mutual coupling estimation, respectively. In the simulation, it is found that the RMSE of DOA estimation decreases with the increase of M, while the RMSE of mutual coupling estimation hardly changes with M. Therefore, the method of the present disclosure runs better than the iterative method, and compares the average running time of the method of the present disclosure and the iterative method, get the relationship between the average running time and m in scenario I, as shown in FIG. 12. It can be seen from the figure that the method of the present disclosure is more effective than the iterative method in calculation.

In another embodiment, the present disclosure also provides a direction-of-arrival estimation and mutual coupling calibration system with arbitrary sensor geometry and unknown mutual moupling, it includes a noise subspace acquisition module, a spectrum function acquisition module, a DOA and mutual coupling coefficient acquisition module, the noise subspace acquisition module is used for acquiring an array signal, according to the array signal, and then estimating a covariance matrix according to the array signal, decomposes the covariance matrix to obtain a noise subspace; the spectrum function acquisition module is used to determine the angle search range of DOA, and generate a group of grids according to the angle search range of DOA, obtains a spectrum function corresponding to each grid according to the noise subspace and the mutual coupling matrix between the array elements;

the DOA and mutual coupling coefficient acquisition module is used to estimate the DOA according to the peak value of the spectrum function corresponding to each grid, DOA is estimated, obtain the mutual coupling coefficient between the array elements from the DOA.

Preferably, the noise subspace acquisition module decomposes the covariance matrix to obtain a noise subspace, including, $$\hat{R} = \sum_{m=1}^{M} \alpha_m u_m u_m^H$$

$$= U_s \sum_s U_s^H + U_n \sum_n U_n^H$$

$\hat{R}$ is covariance matrix, $\alpha_1 \geq \alpha_2 \geq \ldots \geq \alpha_K \geq \alpha_{K+1} \geq \ldots \geq \alpha_M$ are the eigenvalue of covariance matrix, $u_m \in \pounds^{M \times 1}$ is the eigenvector corresponding to the eigenvalue of the covariance matrix, $U_s=[u_1, u_2, \ldots, u_K]$, $\Sigma_s=\text{diag}\{\alpha_1, \alpha_2, \ldots, \alpha_K\}$, $U_n=[u_{K+1}, u_{K+2}, \ldots, u_M]$, $\Sigma_n=\text{diag}\{\alpha_{K+1}, \alpha_{K+2}, \ldots, \alpha_M\}$, $U_s$ and $U_n$ are signal subspace and noise subspace respectively.

Preferably, the spectrum function acquisition module obtains a spectrum function corresponding to each grid according to the noise subspace and the mutual coupling matrix between the array elements, specifically including, using max $d^H Q^{-1}(\Theta) d$ to get the spectrum function of each grid, $Q(\Theta)=T^H(\Theta)U_n U_n^H T(\Theta)$, $T(:,q)=J_q a$, $a \in \pounds^{M \times M}$, $$J_q(m, n) = \begin{cases} 1, & C(m, n) = c_q \\ 0, & C(m, n) \neq c_q \end{cases},$$

$d=[1, 0, \ldots, 0]^T$, $q=1, 2, 3 \ldots Q$, $Q<M$, C is the mutual coupling matrix between elements, $U_n$ is the noise subspace, $T \in \pounds^{M \times Q}$, $c=[c_1, c_2, \ldots, c_Q]^T$, $T(:,q)$ is column q of T, $1 \leq n$, $m \leq M$.

Preferably, the DOA and the mutual coupling coefficient acquisition module obtain the mutual coupling coefficient between the array elements from the DOA, specifically including, $$\hat{c} = \frac{1}{K}\sum_{k=1}^{K} \frac{\rho^2 Q^{-1}(\hat{\Theta}_k)d}{d^H Q^{-1}(\hat{\Theta}_k)d}$$

is used to obtain the mutual coupling coefficient between the elements, ĉ is the mutual coupling coefficient, ρ is the constant, $\hat{\theta}_k$ is the estimated DOA.

It should be noted that the points not repeatedly described in embodiments 1 and 2 can be used for reference.

The present disclosure also provides a direction-of-arrival estimation and mutual coupling calibration method and system with arbitrary sensor geometry and unknown mutual moupling, by acquiring the array signal, the covariance matrix corresponding to the array signal is estimated according to the array signal, determine the angle search range of DOA, and generate a group of grids according to the angle search range of DOA, according to the noise subspace and the mutual coupling matrix between the elements, the spectrum function corresponding to each grid is obtained, according to the peak value of spectrum function corresponding to each grid, DOA is estimated, obtaining the mutual coupling coefficient between the array elements from the estimated DOA, the DOA estimation and mutual coupling calibration of arbitrary array manifold under the condition of mutual coupling are realized simply, can be applied to real-time system.

It is to be understood, however, that even though numerous characteristics and advantages of the present invention have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A direction-of-arrival estimation and mutual coupling calibration method with arbitrary sensor geometry and unknown mutual coupling, comprising the following steps:
   (a) acquiring an array signal, and then estimating a covariance matrix according to the array signal, a noise subspace is obtained by eigendecomposition of the covariance matrix;
   (b) determining an angle search range of DOA, and generating a group of grids according to the angle search range of DOA, based on the noise subspace and a mutual coupling matrix between elements, and obtaining a spectrum function corresponding to each grid; wherein according to the noise subspace and the mutual coupling matrix between the array elements to obtain the spectrum function corresponding to each grid, comprising,
   using max $d^H Q^{-1}(\Theta)d$ to get the spectrum function of each grid, $Q(\Theta)=T^H(\Theta)U_n U_n^H T(\Theta)$, $T(:,q)=J_q a$, $a\in \pounds^{M\times M}$, $$J_q(m,n) = \begin{cases} 1, & C(m,n) = c_q \\ 0, & C(m,n) \neq c_q \end{cases},$$

$d=[1,0,\ldots,0]^T$,
$q=1,2,3\ldots,Q$, Q<M, C is the mutual coupling matrix between elements, $U_n$ is the noise subspace, $T\in\pounds^{M\times Q}$, $c=[c_1, c_2,\ldots,c_Q]^T$, T(:,q) is column Q of T, $1\leq n,m\leq M$; and
   (c) Estimating DOA based on a peak value of spectrum function corresponding to each grid, and obtaining the mutual coupling coefficient between the array elements from the DOA.

2. The direction-of-arrival estimation and mutual coupling calibration method with arbitrary sensor geometry and unknown mutual coupling according to claim 1, a noise subspace is obtained by eigendecomposition of the covariance matrix, including $$\hat{R} = \sum_{m=1}^{M} \alpha_m u_m u_m^H \qquad (7)$$

$$= U_s \sum_s U_s^H + U_n \sum_n U_n^H$$

$\hat{R}$ is covariance matrix, $\alpha_1 \geq \alpha_2 \geq \ldots \geq \alpha_K \geq \alpha_{K+1} \geq \ldots \geq \alpha_M$ are the eigenvalue of covariance matrix, $u_m \in \pounds^{M\times 1}$ is the eigenvector corresponding to the eigenvalue of the covariance matrix, $U_s=[u_1,u_2,\ldots,u_K]$, $\Sigma_s=\text{diag}\{\alpha_1, \alpha_2,\ldots,\alpha_K\}$, $U_n=[u_{K+1},u_{K+2},\ldots,u_M]$, $\Sigma_n=\text{diag}\{\alpha_{K+1}, \alpha_{K+2},\ldots,\alpha_M\}$, $U_s$ and $U_n$ are signal subspace and noise subspace respectively.

3. The direction-of-arrival estimation and mutual coupling calibration method with arbitrary sensor geometry and unknown mutual coupling according to claim 1, obtaining the mutual coupling coefficient between the array elements from the DOA, including, $$\hat{c} = \frac{1}{K}\sum_{k=1}^{K} \frac{\rho^2 Q^{-1}(\hat{\Theta}_k)d}{d^H Q^{-1}(\hat{\Theta}_k)d}$$

is used to obtain the mutual coupling coefficient between the elements, c is the mutual coupling coefficient, ρ is the constant, $\hat{\Theta}_k$ is the DOA, K is signal source number, the superscript T, H and −1 are denote transpose, Hermitian transpose and inverse, respectively.

4. A direction-of-arrival estimation and mutual coupling calibration system with arbitrary sensor geometry and unknown mutual coupling, being connected to at least one terminal device, the direction-of-arrival estimation and mutual coupling calibration system comprising:
   at least one processor; and
   a storage device storing one or more program instructions, which when executed by the at least one processor; causes the at least one processor to:
   acquire an array signal, according to the array signal, and then estimating a covariance matrix according to the array signal, decomposing the covariance matrix to obtain a noise subspace;
   (d) to determine an angle search range of DOA, and generate a group of grids according to the angle search range of DOA, obtains a spectrum function corresponding to each grid according to the noise subspace and a mutual coupling matrix between array elements; wherein according to the noise subspace and the mutual coupling matrix between the array elements to obtain the spectrum function corresponding to each grid, comprising, using max $d^H Q^{-1}(\Theta)d$ to get the spectrum function of each grid, $Q(\Theta)=T^H(\Theta)U_n U_n^H T(\Theta)$, $T(:,q)=J_q a$, $a \in \pounds^{M \times M}$, $$J_q(m,n) = \begin{cases} 1, & C(m,n) = c_q \\ 0, & C(m,n) \neq c_q \end{cases},$$

$d=[1,0,\ldots,0]^T$, $q=1,2,3\ldots,Q$, $Q<M$, C is the mutual coupling matrix between elements, $U_n$ is the noise subspace, $T \in \pounds^{M \times Q}$, $c=[c_1, c_2, \ldots, c_Q]^T$ (:,q) is column Q of T, $1 \le n, m \le M$; and to estimate the DOA according to a peak value of the spectrum function corresponding to each grid, DOA is estimated, obtain the mutual coupling coefficient between the array elements from the DOA.

5. The direction-of-arrival estimation and mutual coupling calibration system with arbitrary sensor geometry and unknown mutual coupling, according to claim 4, wherein decompose the covariance matrix to obtain a noise subspace, including, $$\hat{R} = \sum_{m=1}^{M} \alpha_m u_m u_m^H$$

$$= U_s \sum_s U_s^H + U_n \sum_n U_n^H$$

$\hat{R}$ is covariance matrix, $\alpha_1 \ge \alpha_2 \ge \ldots \ge \alpha_K \ge \alpha_{K+1} \ge \ldots \ge \alpha_M$ are the eigenvalue of covariance matrix, $u_m \in \pounds^{M \times 1}$ is the eigenvector corresponding to the eigenvalue of the covariance matrix, $U_s=[u_1, u_2, \ldots, u_K]$, $\Sigma_s=\text{diag}\{\alpha_1, \alpha_2, \ldots, \alpha_K\}$, $U_n[u_{K+1}, u_{K+2}, \ldots, u_M]$, $\Sigma_n=\text{diag}\{\alpha_{K+1}, \alpha_{K+2}, \ldots, \alpha_M\}$, $U_s$ and $U_n$ are signal subspace and noise subspace respectively.

6. The direction-of-arrival estimation and mutual coupling calibration system with arbitrary sensor geometry and unknown mutual coupling, according to claim 4, wherein obtain the mutual coupling coefficient between the array elements from the DOA, including, $$\hat{c} = \frac{1}{K} \sum_{k=1}^{K} \frac{\rho^2 Q^{-1}(\hat{\Theta}_k) d}{d^H Q^{-1}(\hat{\Theta}_k) d}$$

is used to obtain the mutual coupling coefficient between the elements, $\hat{c}$ is the mutual coupling coefficient, $\rho$ is the constant, $\hat{\Theta}_k$ is the estimated DOA, K is signal source number, the superscript T, H and −1 denotes transpose, Hermitian transpose and inverse, respectively.

* * * * *